July 24, 1934.  T. V. BUCKWALTER  1,967,804
RAIL VEHICLE TRUCK
Filed Aug. 30, 1930   2 Sheets-Sheet 1
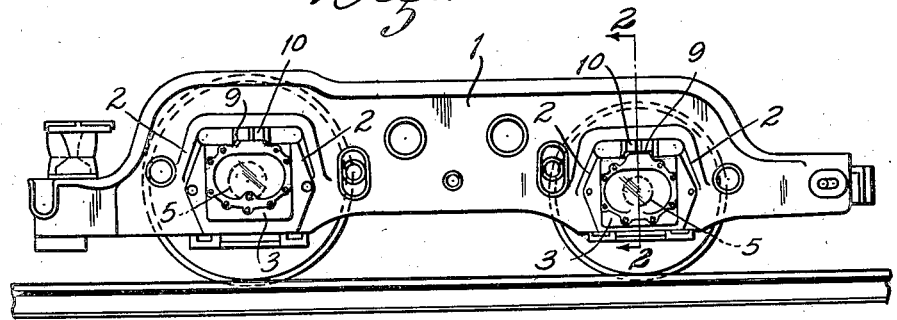
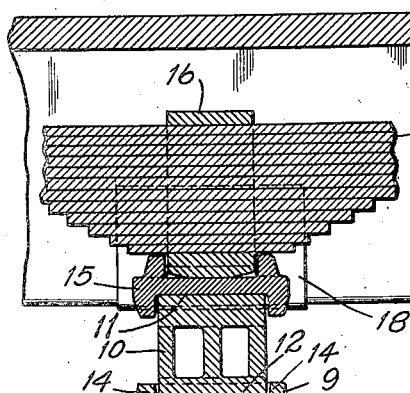
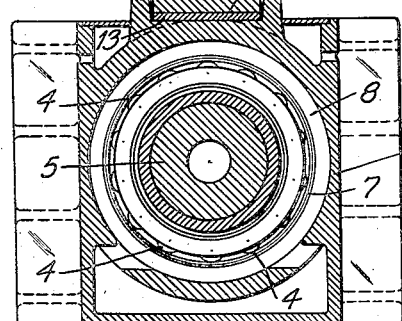
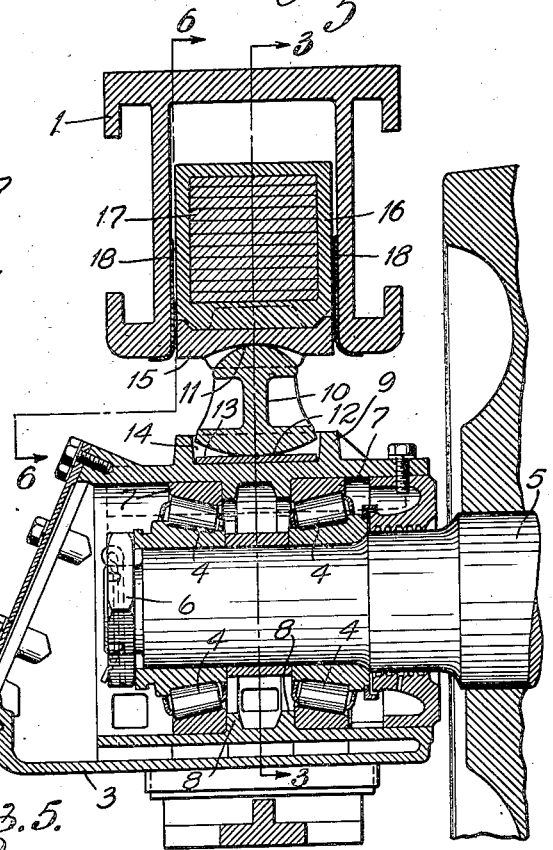
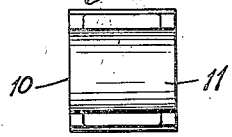
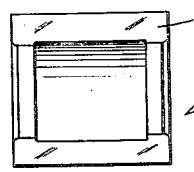

July 24, 1934.　　　T. V. BUCKWALTER　　　1,967,804
RAIL VEHICLE TRUCK
Filed Aug. 30, 1930　　　2 Sheets-Sheet 2
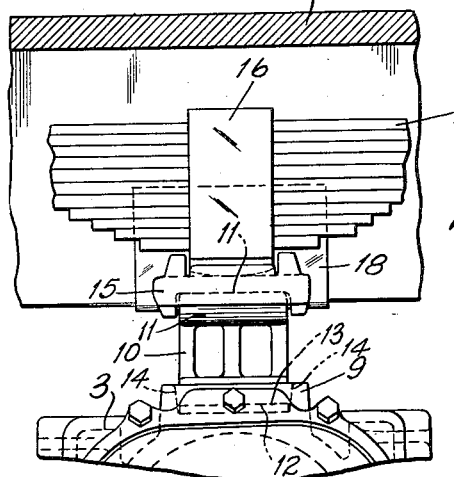
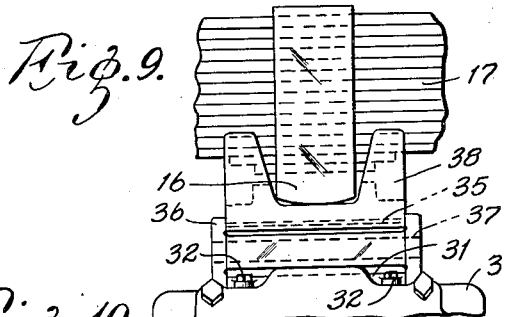
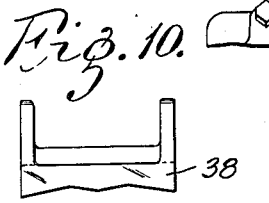
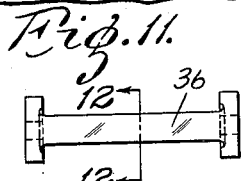
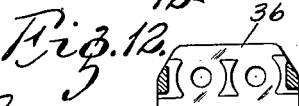
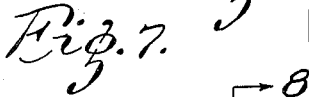
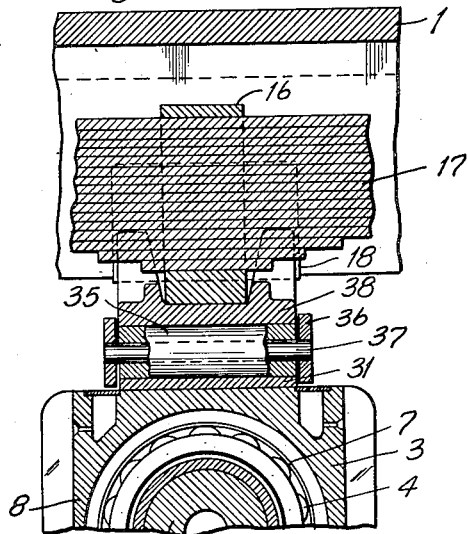
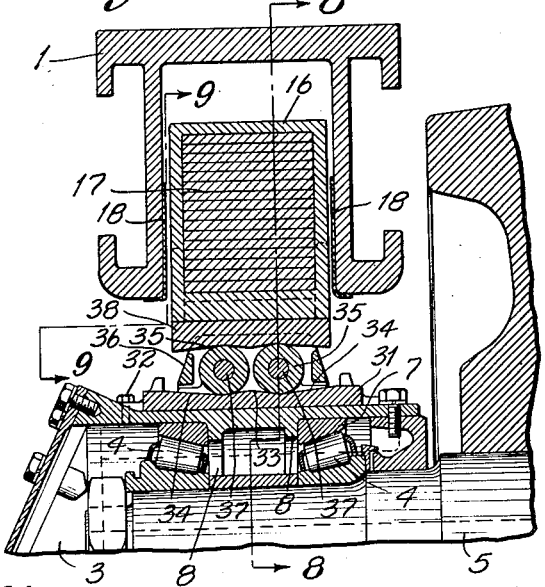
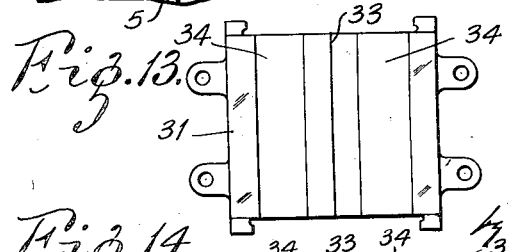
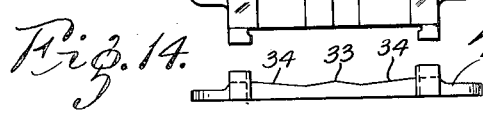
INVENTOR
Tracy V. Buckwalter
HIS ATTORNEYS Patented July 24, 1934

1,967,804

UNITED STATES PATENT OFFICE 1,967,804

RAIL VEHICLE TRUCK

Tracy V. Buckwalter, Canton, Ohio, assignor to The Timken Roller Bearing Company, Canton, Ohio, a corporation of Ohio Application August 30, 1930, Serial No. 478,829

1 Claim. (Cl. 105—222)

My invention relates particularly to engine trailer trucks and has for its principal object a truck in which the frame will have the required freedom of movement with respect to the axles and which will be self-centering or automatically returnable to its normal position and in which the axles can be provided with roller bearings. The invention consists principally in mounting roller bearings between the ends of the axles and the journal boxes and in interposing antifriction rocker or roller elements between the journal boxes and the trailer truck frame. The invention further consists in the engine trailer truck and in the parts, combinations and arrangements of parts hereinafter described and claimed.

In the accompanying drawings, wherein like reference characters indicate like parts wherever they occur, Fig. 1 is a side elevation of an engine trailer truck embodying my invention, Fig. 2 is a sectional view on the line 2—2 of Fig. 1, Fig. 3 is a sectional view on the line 3—3 of Fig. 2, Fig. 4 is a plan view of the rocker member shown in Fig. 2, Fig. 5 is a bottom plan view of the rocker bearing plate of the frame, Fig. 6 is a part elevation, part sectional view on the line 6—6 of Fig. 2, Fig. 7 is a sectional view similar to Fig. 2 showing a slight modification in which rollers are substituted for the rocker illustrated in Fig. 2, Fig. 8 is a sectional view on the line 8—8 of Fig. 7, Fig. 9 is an elevation looking along the line 9—9 of Fig. 7, Fig. 10 is a detail view of the upper contact plate for the roller member, Fig. 11 is a plan view of the roller cage or mounting member, Fig. 12 is a sectional view on the line 12—12 of Fig. 11, Fig. 13 is a plan view of the lower roller contact plate that is mounted on the journal box, and Fig. 14 is an elevation of said plate.

Engine trailer trucks are required by A.R.A. standards to provide for limited lateral movement of the truck frame, that is movement thereof endwise or longitudinally of the car axles. Such axles have heretofore been provided with plain bearings and the truck frame movement has been accommodated by permitting the axle to float in its bearings, the movement being limited by contact of the wheel hubs with the journal boxes. This unrestrained movement now commonly provided results in severe thrusts and stresses being set up, and in creating excessive vibration, particularly at certain speeds. The present construction gives the freedom of movement necessary for proper alinement in rounding curves, but avoids excessive stresses and vibration.

The frame 1 of the trailer truck has pedestals 2 receiving journal boxes 3. According to the present invention, antifriction bearings 4 are interposed between the end of each axle 5 and its journal box 3, the drawings illustrating conical roller bearings 4 held on the axle by means of a nut 6 on the end thereof, the cups 7 or outer bearing members being seated against shoulders 8 in the journal box. The outer end of the journal box is closed by a suitable cap and the inner end by a suitable closure ring.

In the construction shown in Figs. 1 to 6, inclusive, the top of each journal box 3 is provided with an upstanding rib 9 outlining a seat in which is mounted a rocker member 10 having a convexly curved top 11 of rather sharp curvature and a convexly curved bottom 12 of less sharp curvature. A suitable wear plate 13 is interposed between the top of the journal box and the bottom of the rocker member. Each rocker member 10 is mounted so as to be free to rock longitudinally of the journal box or axle (that is laterally of the truck as a whole). The straight sides 14 of the rib prevent movement of the rocker member 10 transversely of the truck. The rocker member 10 is shaped so as to have line contact at all times with said wear plate 13 and with an upper contact plate 15 that is mounted in the truck frame member 1 and engages the under side of a supporting member 16 for suitable springs 17 that are mounted in the truck frame, the curvature of said rocker 10 being only in the direction required to give the desired rocking movement. Suitable wear plates 18 may be provided between the springs 17 and contact plate 15 and the portions of the truck frame 1 adjacent thereto.

In the slightly modified construction shown in Figs. 7 to 14, inclusive, a contact plate 31 is secured to the top of each journal box as by screws 32. Each contact plate has a conical raised portion 33 at the middle sloping downwardly transversely of the truck (longitudinally of the journal box) and side portions 34 inclining upwardly from the lower edge of said conical middle portion to the edges of the contact plate. Suitable rollers 35 are mounted on said contact plate 31 on either side of said conical middle portion 33, said rollers being held in a cage or support 36 by means of pins 37.

An upper contact plate 38 has its under surface provided with sloping portions complementary to those of the lower plate 31, so that the opening between the lower contact plate 31 and the upper contact plate 38 is widest on either side of the middles of the two plates and narrows toward each edge and toward the middle, the rollers being normally disposed in these widest portions of the space between plates. Thus relative movement as between the upper and lower contact plates 31 and 38 results in the plates being forced apart as they roll over the rollers, so that when the force causing this relative movement is removed, the parts tend to move back to normal position.

The upper contact plate extends into the truck frame 1 and receives the saddle or supporting clip 16 for the springs, as previously described.

The antifriction rockers or rollers, as above described, permit movement of the truck frame relative to the axles, but tend to restore the parts to normal position after release of the force causing relative movement. The movement is not unrestrained as in present constructions, but the antifriction members and their contacting surfaces are shaped so that more and more force is required as the parts get further from normal position. Thus the stresses are greatly relieved and there is no tendency to cause excessive vibration.

Obviously numerous changes may be made without departure from my invention and I do not wish to be limited to the precise construction shown.

What I claim is:

A rail vehicle truck comprising a pair of axles, journal boxes for the ends of said axles, pairs of spaced taper roller bearings interposed between said axles and said journal boxes, a truck frame, self-centering antifriction members mounted on said journal boxes to rock longitudinally thereof, contact plates for the tops of said antifriction members extending into said frame, springs in said frame and clips for said springs having convexly curved lower ends resting on said contact plates, said plates having ribs overlapping the edges of said clips.

TRACY V. BUCKWALTER.